United States Patent [19]

Cardenas

[11] Patent Number: 4,974,979

[45] Date of Patent: Dec. 4, 1990

[54] TWINTRACTOR

[75] Inventor: Dayro J. Cardenas, Jersey City, N.J.

[73] Assignee: Brother International Corp., Piscataway, N.J.

[21] Appl. No.: 175,935

[22] Filed: May 23, 1988

[51] Int. Cl.[5] ........................ B41J 11/30; B41J 15/18; G03B 1/30

[52] U.S. Cl. .............................. 400/616.1; 400/616.2; 400/584; 226/75

[58] Field of Search ............ 400/569, 584, 585, 585.1, 400/588, 616, 616.1, 616.2, 616.3, 708, 708.1; 226/74, 75, 76, 77, 78, 79, 80, 81, 82, 83, 84, 85, 86, 87; 74/70, 72, 319, 321

[56] References Cited

U.S. PATENT DOCUMENTS

| | | | |
|---|---|---|---|
| 3,653,483 | 4/1972 | Cortona et al. | 400/585.1 X |
| 3,859,864 | 1/1975 | Offermann | 400/616.2 X |
| 4,023,422 | 5/1977 | Jou et al. | 74/70 |
| 4,368,994 | 1/9183 | Sweeney | 400/584 X |
| 4,606,663 | 8/1986 | Christoph et al. | 400/569 X |

FOREIGN PATENT DOCUMENTS

| | | | |
|---|---|---|---|
| 0062176 | 5/1981 | Japan | 400/584 |

OTHER PUBLICATIONS

IBM Technical Disclosure Bulletin, "Paper Overflow Detector", Casale et al., vol. 13, No. 12, May 1971, p. 3766.

IBM Technical Disclosure Bulletin, "Detachable Printer Pin Feed", Kroeker, vol. 18, No. 11, Apr. 1976, p. 3536.

IBM Technical Disclosure Bulletin, "Independent Dual Form Feed", Kratzert, vol. 20, No. 8, Jan. 1978, pp. 3179-3180.

IBM Technical Disclosure Bulletin, "Side-of-Forms, End-of-Forms, and Forms Jam-Detection Scheme for Printers", Brown et al., vol. 20, No. 11A, Apr. 1978.

IBM Technical Disclosure Bulletin, "Three-Way Clutch for Mulitple Paper Feeding", Mathews, vol. 25, No. 3A, Aug. 1982, pp. 1323-1324.

IBM Technical Disclosure Bulletin, "Mounting-Arrangement for Separate Paper Feed", vol. 28, No. 1, Jun. 1985, pp. 264-266.

*Primary Examiner*—Edgar S. Burr
*Assistant Examiner*—John S. Hilten
*Attorney, Agent, or Firm*—Kane, Dalsimer, Sullivan, Kurucz, Levy, Eisele & Richard

[57] ABSTRACT

The twintractor is a device designed to be incorporated into a wide carriage personal computer printer, or supplied as an accessory to such a printer or a typewriter, giving it the capability of transporting and printing upon, in the alternative, one of two continuous paper media. The availability of such a device will provide the users of personal computers or typewriters with the flexiblility to print jobs on more than one kind of paper output media without the repeated necessity of changing paper encountered in standard 80-column width printers or carriages. A means for changing the zero position or left margin for the print head when the choice of print media is made is also incorporated in the device, as well as paper sensors, paper parking detectors, and removable tractors.

9 Claims, 4 Drawing Sheets

FIG. 1
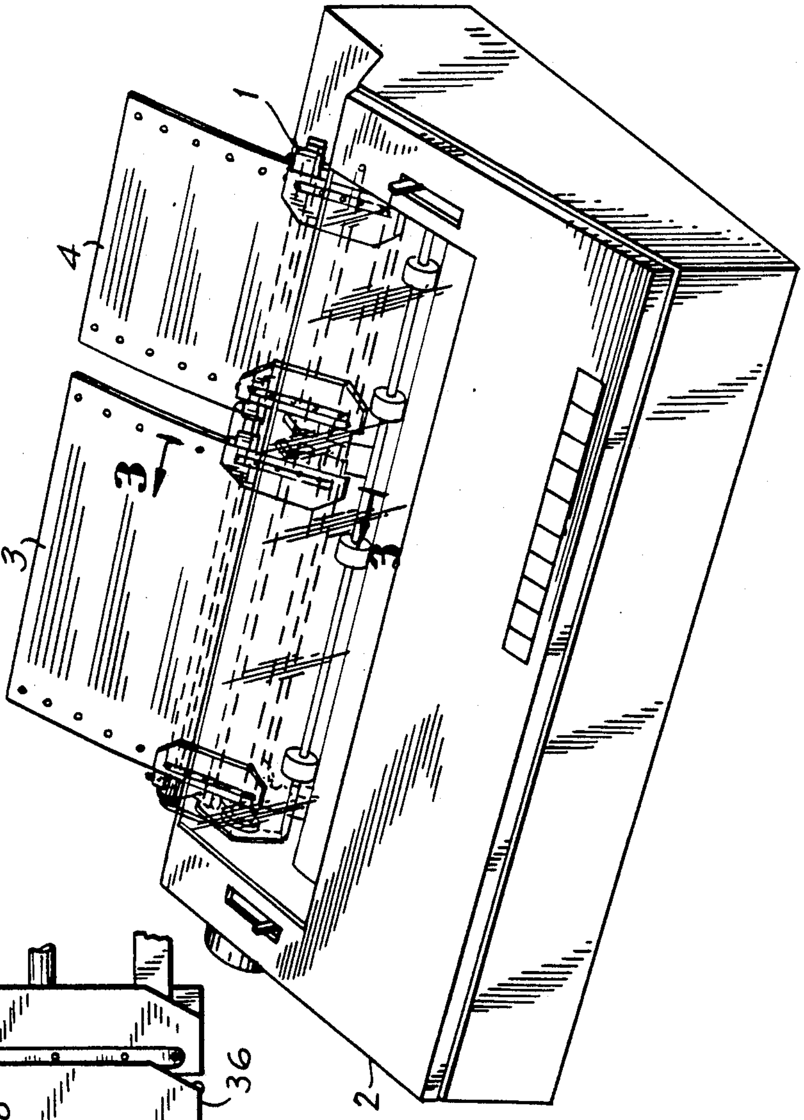
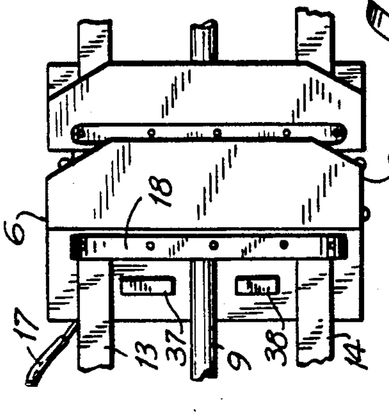
FIG. 7

TWINTRACTOR

BACKGROUND OF THE INVENTION

1. Field of the Invention

This invention relates to the printers used in conjunction with personal computers. More specifically, it involves a way to make such a printer more versatile by providing it with the capability to accommodate more than one paper output medium at any given time.

2. Background Information

Within the past decade, the personal computer industry has grown so quickly that these small computers have come to be considered almost an absolute necessity, rather than a luxury, for those operating small businesses, such as pharmacies, medical or dental practices, and the like. Through the use of such computers, and appropriately designed software, businessmen are able to maintain their accounts, budgets and inventories in a form that can be readily accessible, easy to manage, and much less prone to the problems that can befall paper files.

It is easy with this technology to maintain lists of current or prospective customers and suppliers on appropriate storage media. Often, drawing from such a list, a small businessman or other personal computer user has occasion to do a mass mailing as a way to conduct, for example, an advertising campaign. A general form letter to be sent to all in the target group is composed with spaces left in the appropriate places for insertion of addressee information. Then, the file of target addresses is accessed and a "personalized" letter to each in that group is printed out.

When this job has been completed, the same file of target addressees must again be accessed in order that mailing labels can be printed. While this in itself is a simple matter, the troublesome, intermediate step of changing the output medium must first be performed. In a rather short time, the repeated changing of output media, in order to make full use of the personal computer's capabilities, becomes quite tiresome.

Currently, the only alternative open to the personal computer user is to purchase a second printer and to dedicate it to the printing of mailing labels alone. Then, either by selecting the printer desired through a software command or by changing the position of an external switch, output would be directed to one printer or the other.

While this option would allow one to avoid the repeated substitution of various paper media in a single printer, it calls for the additional investment in a second printer and associated connecting hardware. In addition, one loses the use of the additional desk or table space required by the second printer.

These difficulties would be solved by the availability of a single printer having a carriage wide enough to accommodate more than one output media side-by-side at any given time. For example, with reference to the above discussion, a printer wide enough to handle both 80-column letter stationary and 35-column address labels would present a highly desirable option to a small businessman who wishes to make more efficient use of his personal computer and printer.

SUMMARY OF THE INVENTION

This invention is a device which incorporates two separate and independently driven means for transporting continuous paper media. Only one of the two means for transporting continuous paper media is operated at any given time as output from a personal computer is being printed on the paper media loaded therein. The device can either be built into a wide carriage printer of the kind commonly used with personal computers, or supplied as an accessory for such a printer. It is also possible, with appropriate design modification, to adapt it for use as an attachment on a typewriter as an accessory.

In the present context, the term "tractor" refers to the mechanism which carries out the task of transporting the continuous paper. It does so by means of belts having regularly spaced pins which engage with equally spaced holes along the side edges of the continuous paper. The simultaneously driven belts pull or push the paper through the printer. The so-called twintractor of this invention, therefore, comprises two such tractors arranged in a side-by-side relationship with respect to each other on a single printer.

It is contemplated that at any given time, only one of the tractors will actually be in use. However, with this invention, it will no longer be necessary to change paper media as is the case with a narrow 80-column printer, when one wishes to print address labels instead of letters, or vice versa. Instead, by appropriate means, power is delivered only to the tractor carrying the desired paper output medium. At the same time, the print head, which is the component actually printing the output character-by-character and line-by-line, is automatically aligned with the left-hand margin of the paper output medium chosen. These can be done either separately or simultaneously, either by mechanical or electromechanical means, or by an appropriate command from the computer keyboard.

Each of the tractors further comprises both a paper sensor and a paper parking detector. The paper sensors are essentially means which determine whether paper is currently loaded in the tractor. If the command is given to direct output to a tractor then not loaded with paper, the printer will be automatically disabled and a warning to that effect given to the operator, either by the printer or through the personal computer.

The paper parking detector carries out a different function. In most personal computer printers is included a platen, a rubber-covered roller like that in a typewriter, around which the paper is wrapped during the actual printing. The platen turns in sequential steps as lines of output are printed on the paper.

As noted above, only one of the two tractors will actually be in use at any given time. However, the turning action of the platen will tend to pull the paper output medium in the tractor then not in use, because of frictional forces between the surface of the platen and the paper. This, in turn, will tend either to inhibit the free turning of the platen or to tear the paper not in use, especially at the points where the pins on the stationary tractor belts engage with the holes along the paper's side edges. The paper parking detector provides a way to solve this problem without completely unloading the unused paper from the tractor.

This solution is as follows. Once the choice of paper output medium to be used has been made, the paper parking detector provides a means to withdraw the other paper output medium from around the platen. When the paper is withdrawn to the location of the paper parking detector, it sends out an appropriate signal to halt the withdrawal and "park" the paper at that point. The paper parking detector can be located, for example, with the paper sensor in the tractor.

When the choice of printing on the "parked" paper output medium is made, the other medium is withdrawn, as above, and then the chosen medium is advanced automatically into the printer, around the platen, until the top line of the form aligns with the print head. Stated somewhat differently, the paper parking detector ensures that the paper is advanced by an amount which corresponds to the paper path length between that detector and the point on the platen where printing is actually carried out.

With a printer incorporating a twintractor, the user also has the alternative of being able to use the complete width of the printer for standard 136-column paper by sliding one of the tractors to one side of the printer and loading the other with the wider paper. This assumes, however, that the rods on which the tractors are mounted are long enough to allow for this. Alternatively, the rods themselves could be designed to come apart in the middle in order to permit the removal of the temporarily unused tractor.

By means of this invention, therefore, the personal computer user is provided with a way to give his printer a much greater flexibility than that possessed by any of those currently available on the market.

BRIEF DESCRIPTION OF THE DRAWINGS

FIG. 1 depicts the twintractor of the present invention as it would appear when installed on a typical personal computer printer.

FIG. 7 shows the paper sensor and paper parking detector incorporated into the right side of a tractor.

DESCRIPTION OF THE PREFERRED EMBODIMENT

In the description which follows, any reference to either orientation or direction is intended primarily for the purpose of illustration and is not intended in any way as a limitation of the scope of the present invention.

With reference to FIG. 1, the twintractor of the present invention is shown installed as an accessory on a personal computer printer 2. As discussed above, the twintractor 1 is designed to transport in the alternative two separate paper output media. For the purpose of our present discussion, we shall assume that standard 80-column width letter stationery 3 has been loaded into the left-hand tractor of the twintractor 1 and mailing labels 4 have been loaded into the right-hand tractor. Both forms of paper output media are assumed to be in continuous form. In general, any two kinds of paper output media can be loaded simultaneously into the twintractor 1 provided that their combined width can be handled by the printer.

Figure 2:
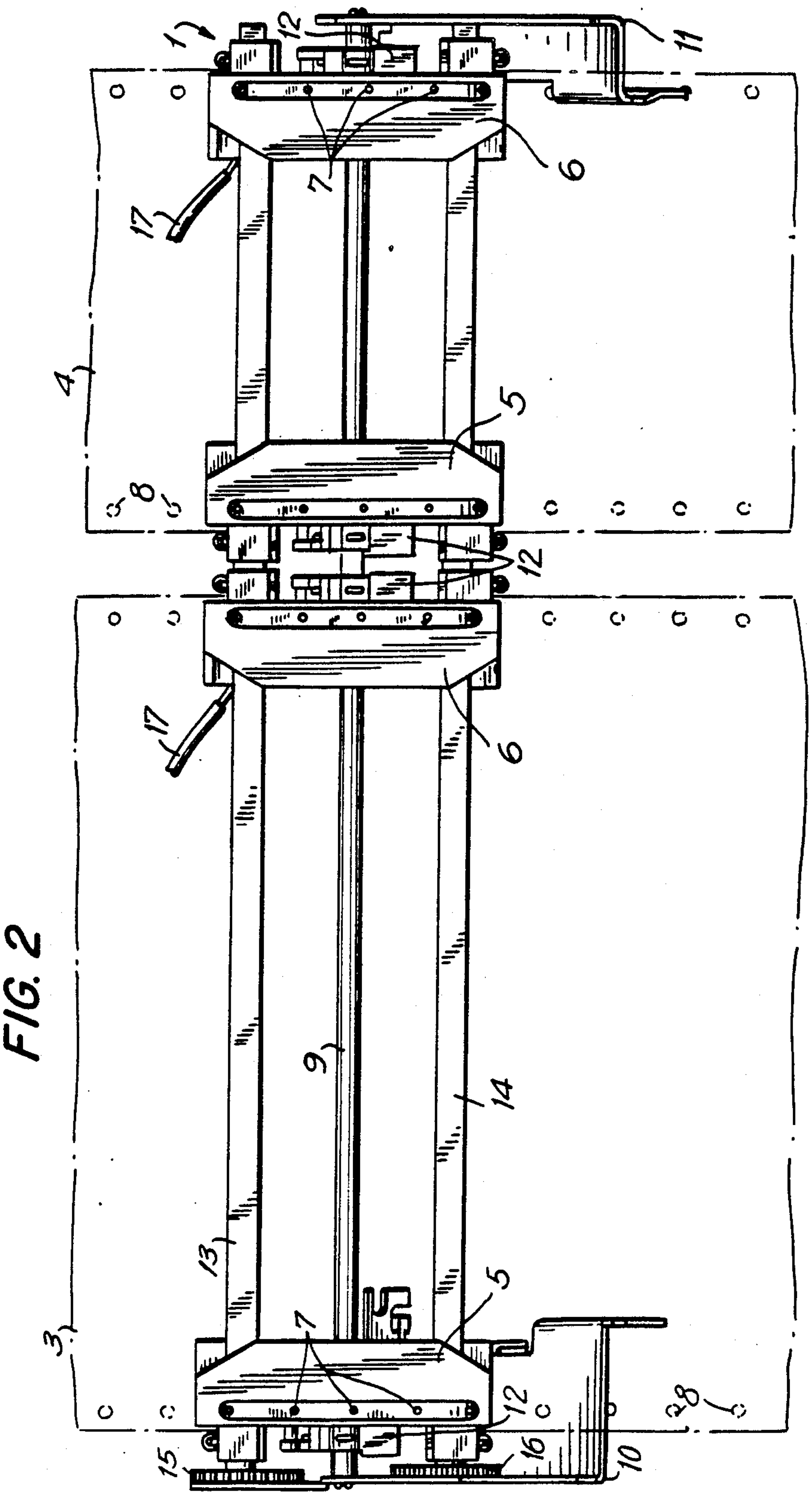
FIG. 2 presents the appearance of the twintractor before installation on a personal computer printer.

Proceeding on to FIG. 2, a closer view of the twintractor 1, it can more clearly be seen that it can simultaneously be loaded with two paper output media, in this case, letter stationery 3 and mailing labels 4, each carried separately by its own independently driven tractor.

Each tractor has a left side 5 and a right side 6. Both sides of each tractor include means comprising evenly spaced pins 7 which protrude through equally spaced holes 8 on the side edges of the paper output media. This engagement of pins 7 through holes 8 is the mechanism whereby the paper output media is driven.

Defining the width of the twintractor 1 is a clamp rod 9. Suitably attached to the ends of the clamp rod 9 are a left end piece 10 and a right end piece 11. The left side 5 and the right side 6 of both tractors are slideably deployed on the clamp rod 9. All can be locked into fixed positions on the clamp rod 9 by clamping mechanisms 12. By the release of a clamping mechanism 12, the left side 5 or right side 6 of a tractor can be moved in order to accommodate paper output media of various widths.

Two other rods, parallel to the clamp rod 9, extend across the width of the twintractor 1. For convenience, they are referred to as a top rod 13 and a bottom rod 14. For reasons to be explained below, these should not be of circular cross-section. The top rod 13, when turned by means of gear 15 at its extreme left end, drives the left side 5 and the right side 6 of the left-hand tractor, thereby transporting the letter stationery 3. The bottom rod 14, when turned by means of gear 16 at its extreme left end, drives the right-hand tractor in the same way, thereby transporting the mailing labels 4.

It will be noted in FIG. 2 that the right side 6 of each tractor is supplied with an electrical connecting cable 17. This carries out two functions which will be discussed in connection with a later figure.

Figure 3:
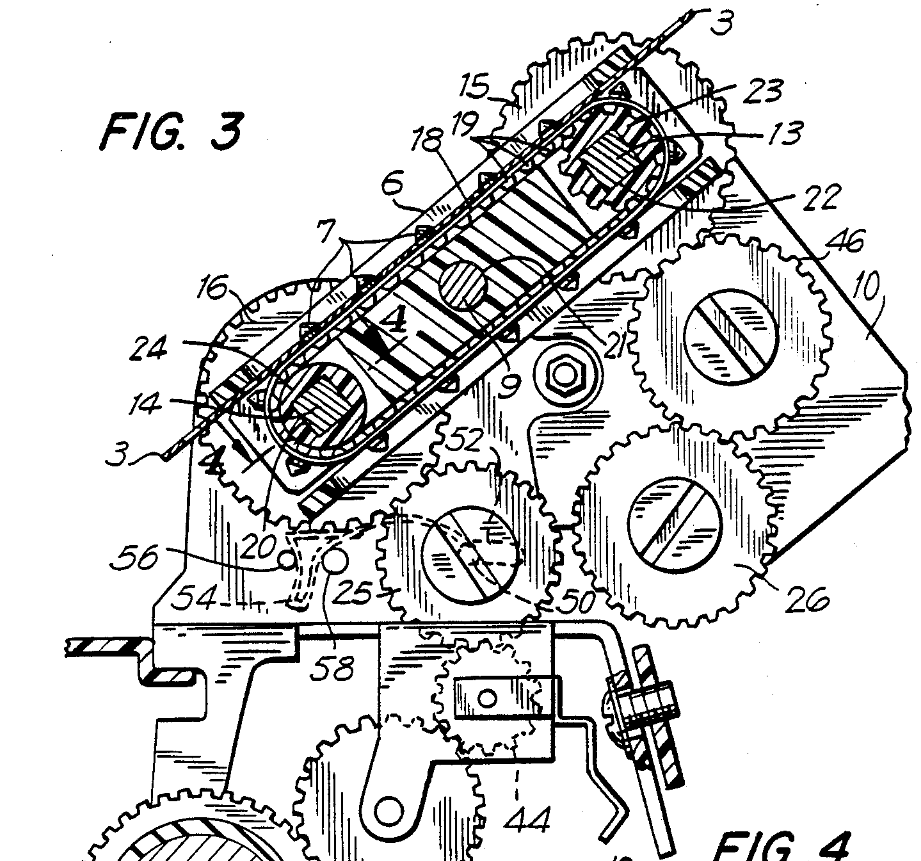
FIG. 3 is a section view taken along the line 3—3 and in the direction indicated in FIG. 1, showing the means whereby the tractors may be alternately driven.
Figure 3:
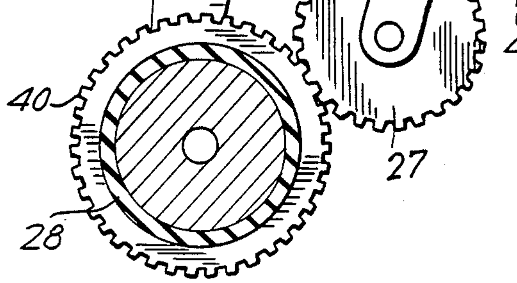

Turning now to FIG. 3, one is given a section view of the twintractor 1 taken along the line 3—3 and in the direction indicated in FIG. 1. The cross-section of the right side 6 of the left-hand tractor will be first discussed.

The pins 7, whose task is to actually move the paper output media, can be seen as evenly spaced projections on the outer surface of a belt 18. The inner surface of the belt 18 is characterized by evenly spaced teeth 19. Cross-sectional views of the clamp rod 9, the top rod 13, and the bottom rod 14 are also included. When the clamping mechanism 12, shown in FIG. 2, is released, there is sufficient clearance at points 20, 21, and 22 to enable the right side 6 of the left-hand tractor to slide along the clamp rod 9, top rod 13, and bottom rod 14. The left sides 5 and rights sides 6 of both tractors share all the characteristics mentioned in this paragraph.

It should be recalled that the top rod 13 was said to drive the left-hand tractor, and the bottom rod 14 was said to do so for the right-hand tractor. The manner in which this can be accomplished is also illustrated in FIG. 3. It will be seen there that a gear 23 is deployed on top rod 13, and a wheel 24 is deployed on bottom rod 14. Gear 23 comprises teeth which mesh with the teeth 19 on the inside of the belt 18. By this means, when the top rod 13 is rotated by gear 15, gear 23 will move belt 18. The smooth surface of wheel 24 will ensure that the teeth 19 of belt 18 will encounter little resistance when sliding over that surface. By the same token, when bottom rod 14 is rotated by gear 16, the smooth surface of wheel 24 will not permit it to drive belt 18.

The left side 5 and the right side 6 of the left-hand tractor both operate as described in the above paragraph and as illustrated in FIG. 3. That is, the rotation of top rod 13 drives the belts 18 on both left side 5 and right side 6 simultaneously, thereby transporting the paper output media 3 located there. The rotation of the bottom rod 14 has no effect upon the left-hand tractor.

The left side 5 and the right side 6 of the right-hand tractor differ from what is shown in FIG. 3 in one important respect, that the positions of gear 23 and wheel 24 are reversed. That is, gear 23 is deployed on the bottom rod 14 and wheel 24 is deployed on the top rod 13. In this way, the rotation of the bottom rod 14 drives the belts 18 of the left side 5 and the right side 6 of the right-hand tractor simultaneously, thereby transporting the paper output media 4 located there. The rotation of top rod 13 has no effect upon the right-hand tractor because of the smooth surface of wheel 24. In either case, the non-circular cross-section of top rod 13 and bottom rod 14 will enable them to rotate gears 23 and wheels 24 even though there is clearance, as mentioned above, at points 20 and 22.

In FIG. 3, a detailed view of the left end piece 10 of the twintractor 1 is presented. Gear 15 and gear 16 provide the means for rotating the top rod 13 and the bottom rod 14 respectively. Additional gears are depicted in order to indicate one way in which the top rod 13 and the bottom rod 14 can be driven in the alternative. Gear 25 can be moved slideably between two positions, where it drives in the alternative gear 16 or gear 26, which eventually drives gear 15. In the latter instance, to be more specific, gear 26 drives gear 46, which, in turn, drives gear 15. The change in position of gear 26 can be accomplished by any of a great number of means known to those skilled in the art.

In FIG. 3, gear 25 is retained on end piece 10 by pin 50, which passes through slot 52 in end piece 10. Pin 50 acts as an axle for gear 25, which rotates thereabout. Gear 25 and pin 50 may be slid from one end of slot 52 to the other to engage, in the alternative, gear 16 or gear 26.

Gear 25 may be moved between the two end positions of slot 52 by hand. Retaining clip 54, attached to pin 50, may be secured between two nubs 56, 58 to retain gear 25, in the position shown in FIG. 3, to drive gear 16. On the other hand, retaining clip 54 may be retained to the right of nub 58 in FIG. 3 to force pin 50 against the opposite end of slot 52, so that gear 25 may engage with gear 26.

Gear 27 is designed to engage with a gear 40 in the personal computer printer 2 for which the twintractor 1 is intended as an accessory. More specifically, gear 27 engages with gear 40 at the extreme end of platen 28 when the twintractor 1 is installed in the printer 2. In this way, the twintractor 1 is operated in tandem with the platen 28 of the printer 2 and advances the paper the appropriate amount as the printer 2 provides output line-by-line.

It will finally be observed in FIG. 3 that gear 27, driven by gear 40, drives gear 44, which, in turn, drives gear 25. In general, it will be obvious to those skilled in the art that the gear ratios must be chosen to ensure that the twintractor 1 will transport continuous paper media 3, 4 by an amount equivalent to one line whenever the rotation of platen 28 advances it by that amount.

Figure 4:
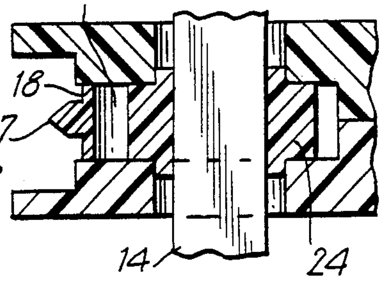
FIG. 4 is a section view taken along the line 4—4 and in the direction indicated in FIG. 3.

Proceeding on to FIG. 4, one can see a section view of the bottom rod 14 at the point and in the direction indicated in FIG. 3. This provides an alternate way to illustrate the feature that the smooth surface of wheel 24, when rotated by bottom rod 14, will not drive belt 18 because of the relative lack of friction between the teeth 19 and the smooth surface of the wheel 24. Similarly, when driven by the top rode 13, the teeth 19 of the belt 18 slide freely over the smooth surface of the wheel 24.

Figure 5:
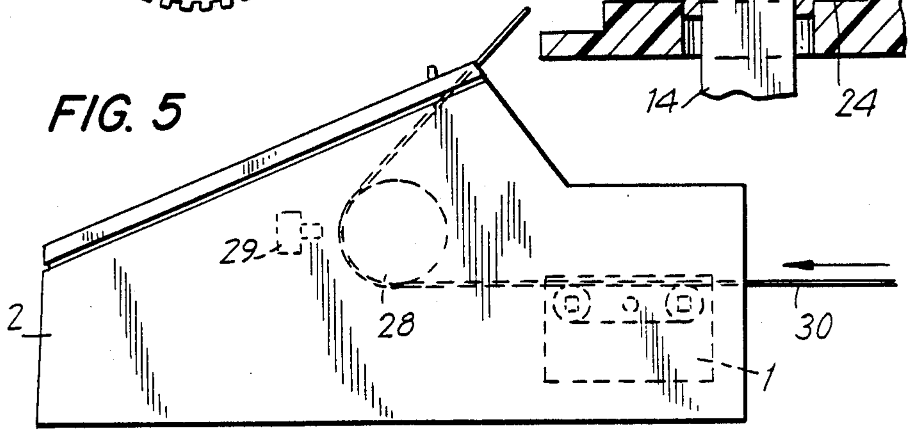
FIG. 5 shows an alternate embodiment of the present invention, where the twintractor is built into a personal computer printer, rather than installed as an accessory.

FIG. 5 presents an alternative embodiment of the invention, where the twintractor 1 is incorporated within a personal computer printer 2 rather than being supplied as an accessory. Also shown is the platen 28, the print head 29, and the paper 30, which is transported through the printer 2 as indicated by the arrow.

Figure 6:
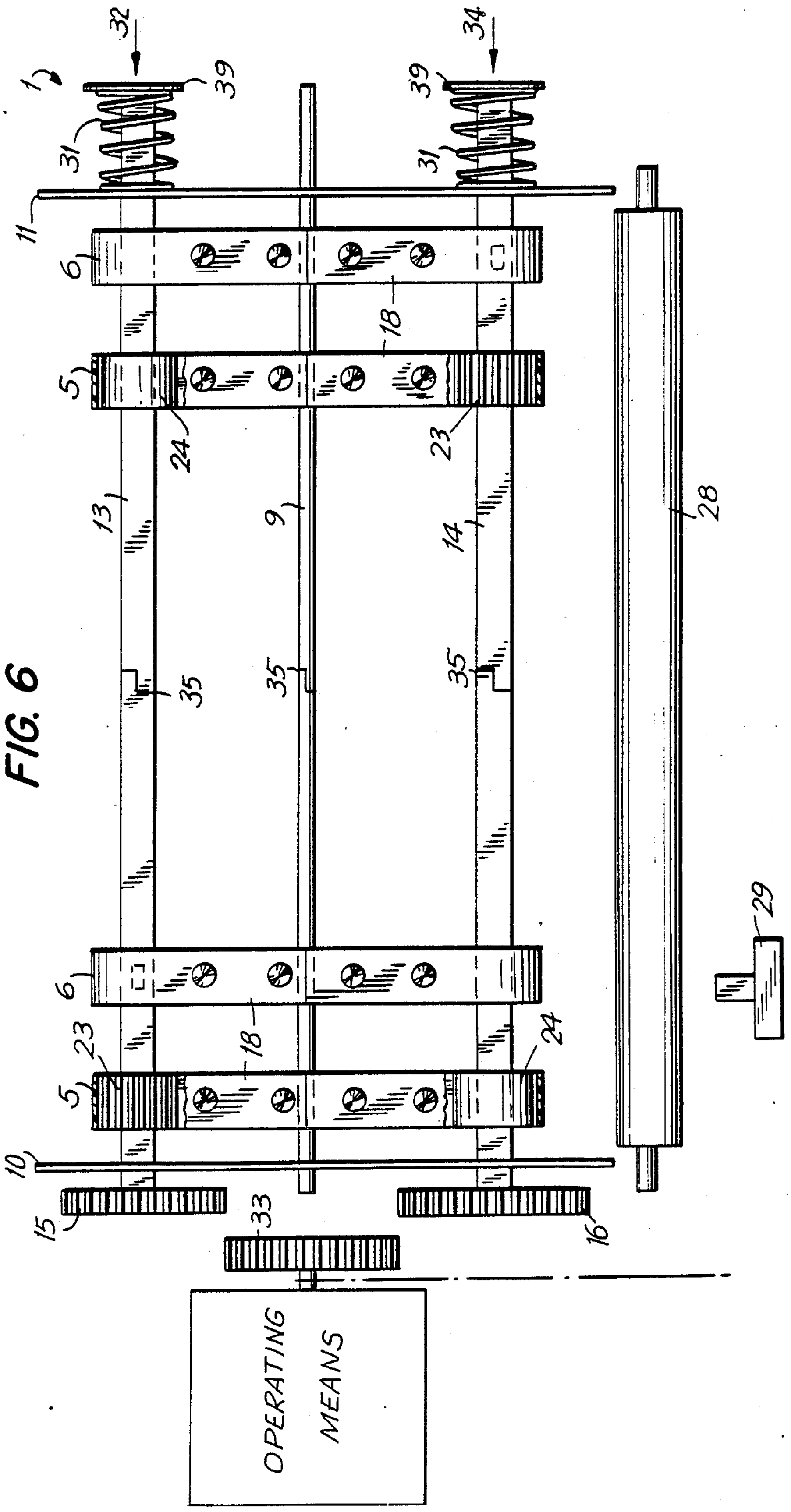
FIG. 6 shows an alternate embodiment of the twintractor, wherein the choice of tractor to be driven is carried out in a different manner, and the rods capable of coming apart to temporarily remove a tractor.

FIG. 6 shows a further alternate embodiment of the twintractor 1, wherein the choice of tractor to be driven is carried out in a slightly different manner. The left end piece 10 and the right end piece 11 of the twintractor 1 are again shown, as are the clamp rod 9, top rod 13, and bottom rod 14. The top rod 13 is rotated by gear 15 at its extreme left end; the bottom rod 14 is rotated by gear 16 at its extreme left end.

In this embodiment, both the top 13 and the bottom rod 14, in addition to being able to rotate freely within holes through the left end piece 10 and the right end piece 11, are able to slide back and forth along their respective axes. As before, the left side 5 and right side 6 of each tractor have a sufficient degree of clearance with respect to the top rod 13 and the bottom rod 14 to permit this sliding motion as this enables them to be adjusted for different paper output media widths. The clamp bar 9 is fixedly deployed between the left end piece 10 and the right end piece 11 and provides the means whereby the sides of each tractor are kept in fixed relative positions. Note further that, as before, when top rod 13 is rotated, gear 23 drives the belts 18 on the left-hand tractor, while the smooth surface of wheel 24 prevents it from having a similar effect on the right-hand tractor. Similarly, when bottom rod 14 is rotated, gear 23 drives the belts 18 on the right-hand tractor, while the smooth surface of wheel 24 prevents it from having a similar effect on the left-hand tractor.

At the extreme right end of each rod 13, 14 is a knob 39. Clamped between each said knob 39 and the right end piece 11 is a spring 31 which exerts a rightward biasing force on each rod 13, 14, tending to maintain or restore them to the positions shown in FIG. 6.

In this embodiment, when one makes the choice to use the left-hand tractor, a biasing force acts on the top rod 13 in the direction indicated by arrow 32, sliding it leftward to a point where the teeth of gear 15 engage with those of drive gear 33. Except for rotation, drive gear 33 is stationary, and is operated by means represented by the labelled rectangle and similar in principle to that seen in FIG. 3. When one has finished with the left-hand tractor, the biasing force is removed and the spring 31 restores the top rod 13 to the position shown in FIG. 6.

Similarly, when one makes the choice to use the right-hand tractor, a biasing force acts on the bottom rod 14 in the direction indicated by arrow 34, sliding it leftward to a point where the teeth of gear 16 engage with those of drive gear 33. When one has finished with the right-hand tractor, the biasing force is removed and the spring 31 restores the bottom rod 14 to the position shown in FIG. 6.

In addition, FIG. 6 illustrates a way in which an unused tractor could be removed from the twintractor 1 in the event the user wishes to load wide paper into the printer. The clamp rod 9, top rod 13, and bottom rod 14, can each be supplied in sections which are joined at points 35. Using this feature, the rods 9, 13, and 14 could be separated and the unused tractor temporarily removed. This can be accomplished in any of a great number of ways known to those skilled in the art.

FIG. 7 shows the right side 6 of either of the tractors on the twintractor 1. As illustrated, the cover 36 has been opened in order to show the structure directly thereunder. As noted before in connection with the discussion of FIG. 2, an electrical connecting cable 17 is supplied to each right side 6. In this way, connection is provided for the paper sensor 37 and the paper parking detector 38. Each of these can be electrical switches of the kind that can be easily depressed and closed by the presence of paper in the tractor.

While the invention has been particularly shown and described with reference to these preferred embodiments thereto, it will be understood by those skilled in the art that various changes in form and details may be made therein without departing from the scope of the appended claims.

What is claimed is:

1. A twintractor for independently and separately transporting two continuous paper sheets through a personal computer printer comprising:

a first tractor for transporting one of the continuous paper sheets;

a second tractor for transporting the other continuous paper sheet;

a first rod whose rotation drives said first tractor;

a second rod parallel to said first rod whose rotation drives said second tractor;

a first gear on the end of said first rod;

a second gear on the same end of said second rod; and a slideable gear which can be moved to positions wherein said slideable gear can in the alternative drive said first gear or said second gear.

2. A twintractor as in claim 1 further comprising a stationary clamp rod, parallel to said first rod and said second rod, so that said first and second tractors can be firmly attached thereto and maintained in fixed positions.

3. A twintractor as in claim 2 wherein said clamp rod comprises means for being separated into sections in order to provide for the removal of an unused tractor.

4. A twintractor as in claim 1 wherein said first rod, and said second rod comprise means for being separated into sections in order to provide for the removal of an unused tractor.

5. A twintractor for independently and separately transporting two continuous paper sheets through a personal computer printer comprising:

a first tractor for transporting one of the continuous paper sheets;

a second tractor for transporting the other continuous paper sheet;

a first rod whose rotation drives said first tractor;

a second rod parallel to said first rod whose rotation drives said second tractor, said first rod and said second rod being capable of translation in a direction parallel to their axes;

a first gear on the end of said first rod;

a second gear on the same end of said second rod;

a drive gear rotatable but otherwise held in a fixed position;

means for biasing the gear end of both said rods away from said drive gear; and means for intermittently opposing both said means for biasing enabling, in the alternative, the gear end of said first or second rod to be engaged with said drive gear.

6. A twintractor for independently and separately transporting two continuous paper sheets through a personal computer printer comprising:

a first tractor for transporting one of said continuous paper sheets;

a second tractor for transporting the other of said continuous paper sheets;

a first rod whose rotation drives said first tractor;

a second rod parallel to said first rod whose rotation drives said second tractor, wherein said first rod and said second rod are translatable in an axial direction;

a first gear on an end of said first rod;

a second gear on an end of said second rod, said end of said second rod corresponding to said end of said ends of said first rod;

a drive gear rotatable but otherwise held in a fixed position;

means for biasing said ends of said first rod and said second rod, having said first gear and said second gear, respectively, away from said drive gear; and means for opposing said means for biasing said first rod and said second rod so that, in the alternative, said first gear on said first rod or said second gear on said second rod can be engaged with said drive gear.

7. A twintractor as claimed in claim 6 further comprising a stationary clamp rod, parallel to said first rod and said second rod, so that said first tractor and said second tractor can be maintained in fixed positions.

8. A twintractor as claimed in claim 7 wherein said stationary clamp rod includes means for being separated into sections in order to provide for the removal of an unused tractor.

9. A twintractor as claimed in claim 6 wherein said first rod and said second rod include means for being separated into sections in order to provide for the removal of an unused tractor.

* * * * *

UNITED STATES PATENT AND TRADEMARK OFFICE
CERTIFICATE OF CORRECTION

PATENT NO. : B1 4,974,979
DATED : June 4, 1996
INVENTOR(S) : Hitoshi TANAKA

It is certified that error appears in the above-indentified patent and that said Letters Patent is hereby corrected as shown below:

Title page item [30], "Foreign Application Priority Data", column 1, line 4, change "62-242099" to ---63-242099---.

Title page item [56], "References Cited", "U.S. PATENT DOCUMENTS", column 1, line 1, change "3,244,884" to ---3,744,884---.

Signed and Sealed this
Fifteenth Day of October, 1996

Attest:

Attesting Officer

BRUCE LEHMAN

*Commissioner of Patents and Trademarks*

US004974979B1

REEXAMINATION CERTIFICATE (2902th)

United States Patent [19]

[11] B1 4,974,979

Tanaka

[45] Certificate Issued Jun. 4, 1996

[54] ZOOM LENS BARREL

[75] Inventor: Hitoshi Tanaka, Tokyo, Japan

[73] Assignee: Asahi Kogaku Kogyo Kabushiki Kaisha, Tokyo, Japan

Reexamination Request:
No. 90/003,601, Oct. 14, 1994

Reexamination Certificate for:
Patent No.: 4,974,979
Issued: Dec. 4, 1990
Appl. No.: 285,030
Filed: Dec. 16, 1988

[30] Foreign Application Priority Data

| | | | |
|---|---|---|---|
| Dec. 21, 1987 | [JP] | Japan | 62-323246 |
| Dec. 21, 1987 | [JP] | Japan | 62-323247 |
| Dec. 21, 1987 | [JP] | Japan | 62-323248 |
| Sep. 26, 1988 | [JP] | Japan | 62-242099 |

[51] Int. Cl.[6] .......... G02B 15/14; G02B 15/00

[52] U.S. Cl. .......... 359/704; 354/195.12

[56] References Cited

U.S. PATENT DOCUMENTS

| | | | |
|---|---|---|---|
| 3,244,884 | 7/1973 | Filipovich et al. | 359/826 |
| 4,074,931 | 2/1978 | Okudaira . | |
| 4,275,952 | 6/1981 | Uesugi . | |
| 4,324,457 | 4/1982 | Tomori . | |
| 4,445,756 | 5/1984 | Komoto . | |
| 4,472,031 | 9/1984 | Muryoi . | |
| 4,472,032 | 9/1984 | Kamata et al. . | |
| 4,726,667 | 2/1988 | Tachihara . | |
| 4,799,073 | 1/1989 | Asano et al. . | |
| 4,799,964 | 10/1988 | Ozawa et al. . | |
| 4,822,153 | 4/1989 | Tomori et al. . | |
| 4,911,542 | 3/1990 | Nishio et al. . | |
| 4,936,664 | 6/1990 | Haraguchi et al. . | |
| 4,944,030 | 7/1990 | Haraguchi et al. . | |
| 4,948,227 | 8/1990 | Takeyasu . | |
| 5,014,077 | 5/1991 | Yomogizawa et al. . | |
| 5,313,329 | 5/1994 | Ueda . | |

FOREIGN PATENT DOCUMENTS

| | | |
|---|---|---|
| 39-15721 | 8/1939 | Japan . |
| 56-83724 | 11/1954 | Japan . |
| 55-133006 | 10/1980 | Japan . |
| 56-85712 | 7/1981 | Japan . |
| 57-16168 | 4/1982 | Japan . |
| 57-116309 | 7/1982 | Japan . |
| 59-148012 | 8/1984 | Japan . |
| 60-3611 | 1/1985 | Japan . |
| 60-162216 | 8/1985 | Japan . |
| 61-121412 | 7/1986 | Japan . |
| 61-188112 | 11/1986 | Japan . |
| 61-259329 | 11/1986 | Japan . |
| 62-109012 | 5/1987 | Japan . |
| 62-209425 | 9/1987 | Japan . |
| 62-200340 | 9/1987 | Japan . |
| 62-201710 | 12/1987 | Japan . |
| 63-2030 | 1/1988 | Japan . |
| 63-70521 | 5/1988 | Japan . |
| 63-149615 | 6/1988 | Japan . |
| 63-149616 | 6/1988 | Japan . |
| 63-271306 | 11/1988 | Japan . |
| 64-11212 | 1/1989 | Japan . |

*Primary Examiner*—Georgia Yvonne Epps

[57] ABSTRACT

A zoom lens barrel wherein first and second lens groups are moved through different distances along an optical axis in interlocking relation to each other to effect zooming. A device for supporting the second lens group is supported by a device for supporting the first lens group in such a manner that the second lens group supporting device is movable along the optical axis relative to the first lens group supporting device. When a drive ring for driving the first lens group supporting device is activated, the first lens group supporting device is moved forward or rearward along the optical axis in response to the rotation of the drive ring and, at the same time, a drive cam device for driving the second lens group supporting device to move along the optical axis relative to the first lens group supporting device is caused to rotate around the optical axis by the drive ring.

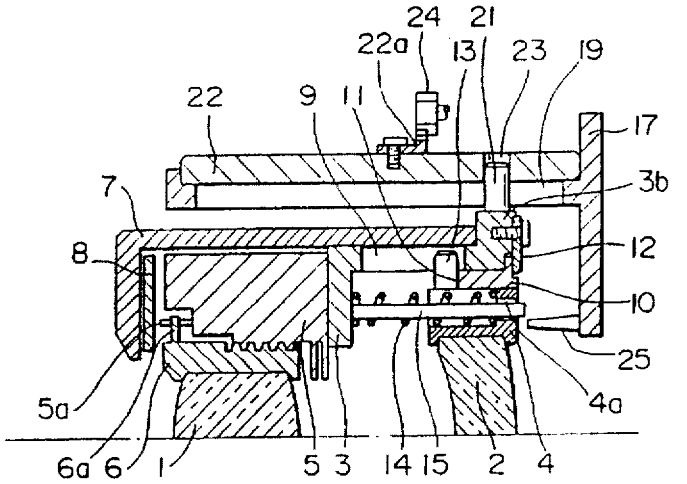

REEXAMINATION CERTIFICATE ISSUED UNDER 35 U.S.C. 307

THE PATENT IS HEREBY AMENDED AS INDICATED BELOW.

Matter enclosed in heavy brackets [ ] appeared in the patent, but has been deleted and is no longer a part of the patent; matter printed in italics indicates additions made to the patent.

AS A RESULT OF REEXAMINATION, IT HAS BEEN DETERMINED THAT:

The patentability of claims 9–12, 20–21 and 24–27 is confirmed.

Claims 1, 6, 13, 16, 19 and 22 are determined to be patentable as amended.

Claims 2–5, 7–8, 14–15, 17–18 and 23, dependent on an amended claim, are determined to be patentable.

New claims 28–31 are added and determined to be patentable.

1. A zoom lens barrel having first and second lens groups which are moved through different distances along an optical axis in interlocking relation to each other to effect zooming, comprising:

a first lens group supporting means for supporting said first lens group, said first lens group supporting means being movable along said optical axis;

a second lens group supporting means for supporting said second lens group, said second lens group supporting means being supported by said first lens group supporting means in such a manner that said second lens group supporting means is movable along said optical axis relative to said first lens group supporting means;

a drive ring provided in such a manner as to be rotatable around said optical axis to cause said first lens group supporting means to move back and forth along said optical axis *for zooming*; and drive cam means fitted to said first lens group supporting means in such a manner as to be rotatable around said optical axis, said drive cam means being rotated by said drive ring so as to cause said second lens group supporting means to move back and forth along said optical axis relative to said first lens group supporting means.

6. A zoom lens barrel having first and second lens groups which are moved through different distances along an optical axis in interlocking relation to each other to effect zooming, comprising:

a first lens group supporting means for supporting said first lens group, said first lens group supporting means being movable along said optical axis;

a second lens group supporting means for supporting said second lens group, said second lens group supporting means being supported by said first lens group supporting means in such a manner that said second lens group supporting means is movable along said optical axis relative to said first lens group supporting means;

a drive ring provided in such a manner as to be rotatable around said optical axis to cause said first lens group supporting means to move back and forth along said optical axis *for zooming*; and drive cam means fitted to said first lens group supporting means in such a manner as to be rotatable around said optical axis, said drive cam means being rotated by said drive ring so as to cause said second lens group supporting means to move back and forth along said optical axis relative to said first lens group supporting means, said drive cam means being provided with a cam surface for determining the position of said second lens group supporting means, while said second lens group supporting means is provided with a guide pin which is pressed against said cam surface of said drive cam means by a means for biasing said second lens group supporting means.

13. A zoom lens barrel having first and second lens groups which are moved through different distances along an optical axis in interlocking relation to each other to effect zooming, comprising:

a first lens supporting means for supporting said first lens group;

a second lens group supporting means for supporting said second lens group, said second lens group supporting means being supported by said first lens group supporting means in such a manner that said second lens group supporting means is movable along said optical axis relative to said first lens group supporting means;

a first drive means for *rotatably* driving said first lens group supporting means to move back and forth along said optical axis *for zooming*; and a second drive means for driving said second lens group supporting means to move back and forth along said optical axis relative to said first lens group supporting means in response to the movement of said first lens group supporting means.

16. A zoom lens barrel having first and second lens groups which are moved through different distances along an optical axis in interlocking relation to each other to effect zooming, comprising:

a first lens supporting means for supporting said first lens group;

a second lens group supporting means for supporting said second lens group, said second lens group supporting means being supported by said first lens group supporting means in such a manner that said second lens group supporting means is movable along said optical axis relative to said first lens group supporting means;

a first drive means for *rotatably* driving said first lens group supporting means to move back and forth along said optical axis *for zooming*; and a second drive means for driving said second lens group supporting means to move back and forth along said optical axis relative to said first lens group supporting means in response to the movement of said first lens group supporting means, wherein said second drive means includes a guide groove rotated in response to the axial movement of said first lens group supporting means, a guide pin being provided on said second lens group supporting means, said guide pin being engaged with said guide groove, and biasing means for pressing said guide pin against a wall surface of said guide groove.

19. A zoom lens barrel having first and second lens groups which are moved through different distances along an optical axis in interlocking relation to each other to effect zooming, comprising:

a first lens supporting means for supporting said first lens group;

a second lens group supporting means for supporting said second lens group, said second lens group supporting means being supported by said first lens group supporting means in such a manner that said second lens group supporting means is movable along said optical axis relative to said first lens group supporting means;

a first drive means for *rotatably* driving said first lens group supporting means to move back and forth along said optical axis *for zooming*; and a second drive means for driving said second lens group supporting means to move back and forth along said optical axis relative to said first lens group supporting means in response to the movement of said first lens group supporting means, wherein, when said first drive means is activated from a short focal length side toward a long focal length side, said first lens group supporting [mean] *means* moves forward along said optical axis and, at the same [times] *time*, said second lens group supporting means is caused by said second drive means to move forward along said optical axis more than said first lens group supporting means, so that said first and second lens groups come closer to each other.

22. A zoom lens barrel having first and second lens groups which are moved through different distances along an optical axis in interlocking relation to each other to effect zooming, comprising:

a first lens supporting means for supporting said first lens group;

a second lens group supporting means for supporting said second lens group, said second lens group supporting means being supported by said first lens group supporting means in such a manner that said second lens group support means is movable along said optical axis relative to said first lens group supporting means;

a first drive means for *rotatably* driving said first lens group supporting means to move back and forth along said optical axis *for zooming*; and a second drive means for driving said second lens group supporting means to move back and forth along said optical axis relative to said first lens group supporting means in response to the movement of said first lens group supporting means, wherein, when said first drive means is [activted] *activated* from a [short] *long* focal length side toward a short focal length side beyond a shortest focal length position, said first lens group supporting means moves backward along said optical axis.

*28. A zoom lens barrel according to any one of claims 1–12, in combination with a zoom lens shutter camera, wherein said zoom lens barrel is incorporated in said zoom lens shutter camera, said camera having a driving motor for rotating said drive ring, said driving motor including a pinion that is in mesh with a toothed member provided about an outer periphery of said drive ring.*

*29. A zoom lens barrel according to any one of claims 13–23, in combination with a zoom lens shutter camera, wherein said zoom lens barrel is incorporated in said zoom lens shutter camera, said camera having a driving motor for driving said first drive means.*

*30. A zoom lens barrel according to any one of claims 24–27, in combination with a zoom lens shutter camera, wherein said zoom lens barrel is incorporated in said zoom lens shutter camera, said camera having a driving motor for driving said drive means.*

*31. A zoom lens barrel according to any one of claims 1–27, in combination with a zoom lens shutter camera having a motor for driving said zoom lens barrel.*

* * * * *